Figure 1:
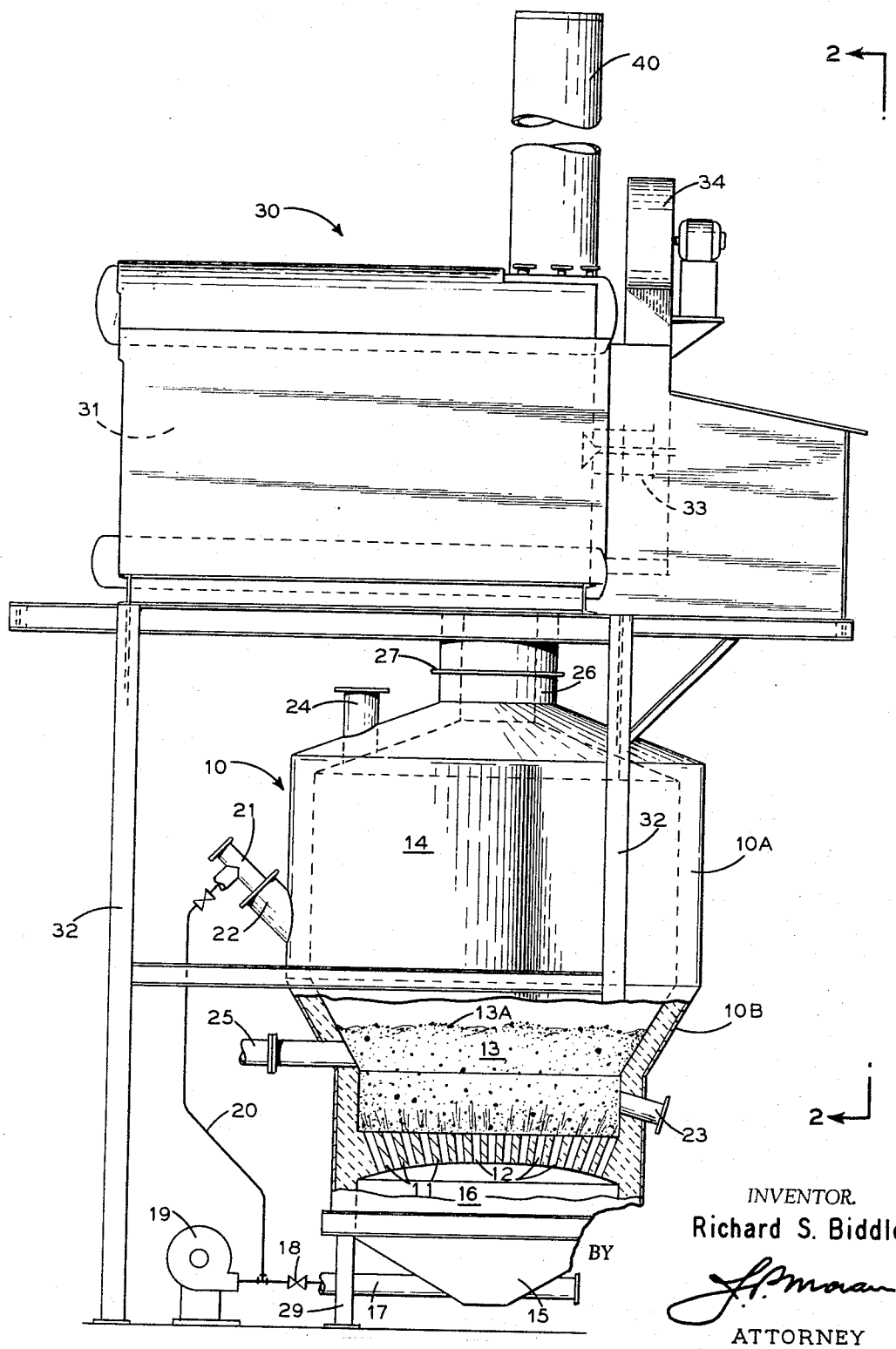

June 27, 1967    R. S. BIDDLE    3,327,660
APPARATUS FOR BURNING WASTE FUEL
Filed June 1, 1964    2 Sheets-Sheet 1

INVENTOR.
Richard S. Biddle
BY
J. P. Moran
ATTORNEY

June 27, 1967  R. S. BIDDLE  3,327,660
APPARATUS FOR BURNING WASTE FUEL
Filed June 1, 1964  2 Sheets-Sheet 2

United States Patent Office 3,327,660
Patented June 27, 1967

3,327,660
APPARATUS FOR BURNING WASTE FUEL
Richard S. Biddle, Darien, Conn., assignor to The Babcock & Wilcox Company, New York, N.Y., a corporation of New Jersey
Filed June 1, 1964, Ser. No. 371,352
2 Claims. (Cl. 110—10)

This invention relates to an apparatus for burning waste fuel. More particularly, this invention relates to the combustion of solid particulate organic waste material having a moisture content of 50–70% under self-sustaining combustion conditions in a fluidized bed reactor, and recovery of heat from the combustion process.

The invention will be described with particular reference to the burning of waste coffee grounds of the type resulting from the manufacture of instant coffee; however, it should be recognized that the invention is not limited to that material, but may be applied to any moisture laden organic waste material of the type herein described. For example, it is also contemplated that the present invention could be used to burn the tea leaves residue from the production of instant tea, the grape hulls left as a residue in production of wine and grape juice, and other similar vegetable waste matter containing 50–70% moisture from like processes.

Instant coffee manufacturers have long recognized that the coffee grounds residue resulting from the manufacture of instant coffee contains a considerable amount of combustible matter and potentially is a valuable source of heat; however, recovery of this heat in an efficient manner has been complicated by the fact that the coffee grounds contain approximately 65% moisture as they come from the manufacturing process. Several methods of disposing of this waste material and obtaining the benefit of its heating value have been devised and used extensively. It was first found that the wet coffee grounds could be burned in their "as is" condition in a refractory lined Dutch-oven type furnace. In these installations the grounds are burned in a pile which is blasted with high temperature (about 600 to 700° F.) combustion air. The quantity of combustion air required to complete combustion in this manner is about 150% of the stoichiometric air requirement. The heat of the combustion air and the heat produced by the burning of the drier portions of the pile were utilized to dry the grounds as they are freshly added to the pile. The gaseous products of combustion from these furnaces are passed over a heat exchanger to recover some of the heat. It will be recognized however that a considerable portion of this heat was utilized in pre-heating the larger quantities of combustion air required, thus reducing materially the net heat output of the unit. This system was effective in disposing of the waste product, but it was cumbersome and expensive. The refractory furnaces and associated air heater represented a high capital investment and occupied a considerable amount of building space; moreover, the furnaces required constant attention and maintenance costs were very high. Subsequently, it was found that by predrying the coffee grounds to about 55% moisture, twice as many coffee grounds could be burned in a given size furnace, and lower air temperatures (but not quantities) could be used. Thus several of the inherent disadvantages of the original system were reduced in magnitude; however, a new piece of equipment, i.e., a press or drier, was required to effect the initial reduction of moisture content from 65 to 55% on a continuous commercial basis. Still later it was found that the grounds could be burned in a spreader stoker if they were pre-dried to 45% moisture. This system again required less air pre-heat and furnace volume, but the large quantities of excess air were still required and in order to reduce the moisture content to the required 45% level, indirect steam driers were needed because available presses were not capable of drying the grounds sufficiently. Thus, the heat equivalent which had formerly been used to pre-heat air was now required to be used for pre-drying the grounds, and there was no effective increase in net heat recovery.

It is an object of the present invention to provide a new and improved process for disposing of organic waste materials and efficiently recovering heat therefrom. It is further an object to provide a system wherein no air heating equipment is needed, thus requiring less capital investment and less building space than was heretofore required in any of the above described systems. Further it is an object of the present invention to increase the net useful heat recovered from the burning of these waste materials by eliminating the necessity for using large amounts of excess combustion air and by burning the waste fuel in its wet condition as it comes directly from the manufacturing process. It is a still further object of the present invention to provide a system which requires less manpower to operate and has lower maintenance costs. An even further object is to provide a waste fuel burning system which is readily adaptable for integration into a modern automated manufacturing process of the type employed in the production of foodstuffs, such as instant coffee.

To accomplish these objects, a method is provided for burning particulate waste organic solid fuel containing ash and having a moisture content as supplied in the range of 50–70% under self-sustaining combustion conditions in an upright refractory lined reactor. The method comprises maintaining a bed of fluidizable inert solid refractory particles positioned between predetermined levels in the frusto-conical lower portion of the reactor. The particulate solid fuel is supplied in suspension in a stream of ambient temperature primary air under a positive pressure to the reactor bed below the upper level thereof so as to intimately mix with the inert refractory particles. Ambient temperatures secondary combustion air is supplied under a positive pressure throughout the bottom of the bed and passes upwardly therethrough to create a turbulent subsantially uniform temperature fluidized mass of intimately mixed inherent material and burning particulate solid fuel throughout the bed. The combined primary and secondary combustion air are equal to substantially the stoichiometric quantity of air required to burn the fuel. The resulting high temperature gaseous combustion products and the ash contained in the fuel are continuously withdrawn from the upper end of the reactor and passed through an associated waste heat boiler where recovery of heat from the gaseous products of combustion is effected.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

Figure 2:
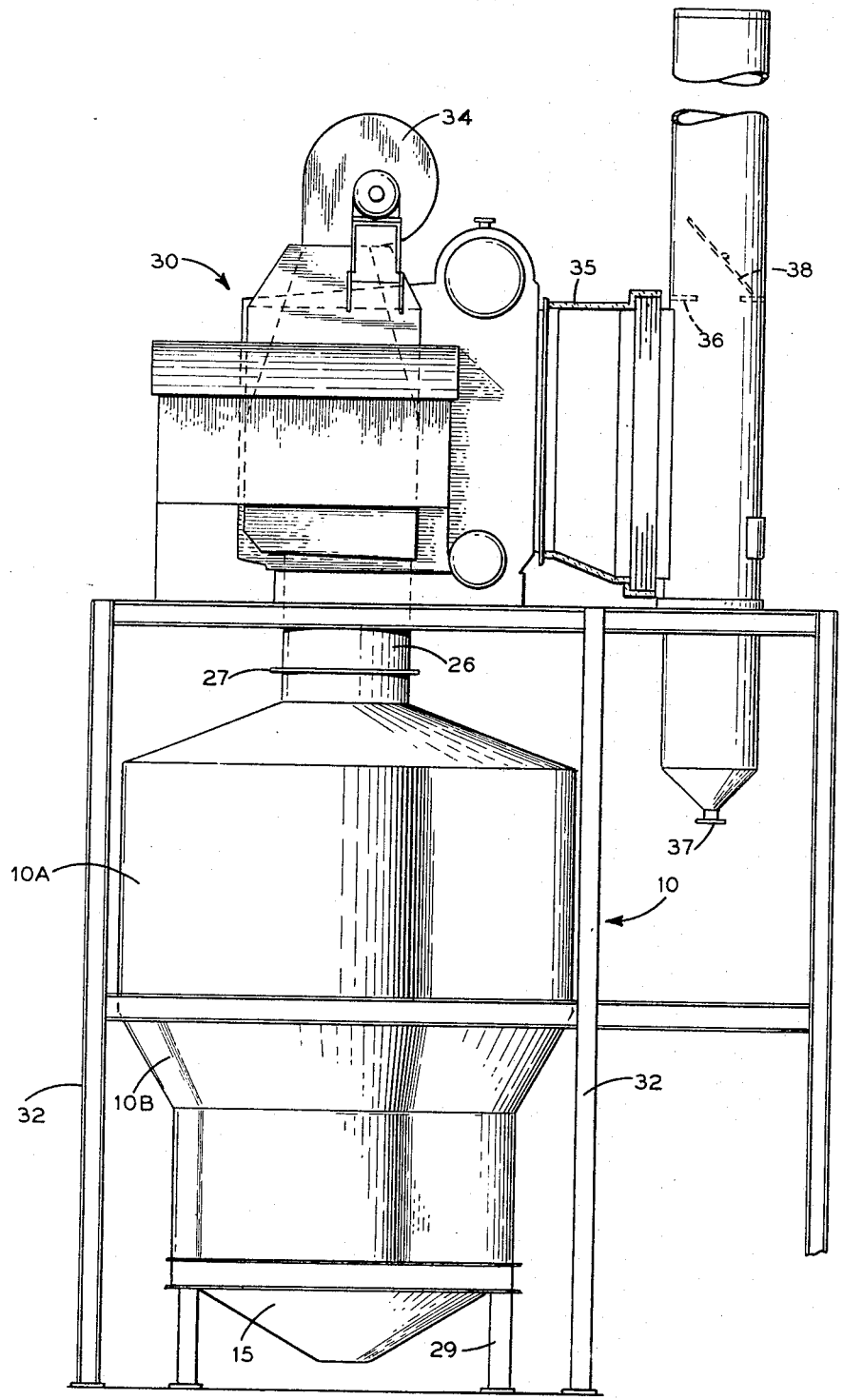

Of the drawings:

FIG. 1 is a side view of the fluidized bed reactor having portions thereof broken away and the associated vapor generator; and FIG. 2 is an end view taken along line 2—2 of FIG. 1.

The drawings show a fluidized bed reactor 10 and an associated vapor generator or boiler 30, the reactor and boiler together being suitable for the efficient disposal of moisture laden process coffee grounds and recovery of heat therefrom.

The reactor 10 is bottom supported on structural legs 29, and includes a cylindrical portion 10A which is connected to a subjacent frusto-conical portion 10B, both portions being formed with a metallic outer wall lined with a suitable protective refractory material. A constriction plate 11, having air admitting apertures 12 formed therethrough, is disposed at the lower end of the reactor 10. The constriction plate 11 is adapted to maintain thereon a fluidized bed 13, the character of which will be discussed hereinafter. The bed 13 has an upper level that is maintained between predetermined heights within the frusto-conical portion 10B. The space within the reactor 10 above the level 13A of the bed 13 is a free-board or dust disengaging space 14. In the base of the reactor 10 and below the constriction plate 11 there is provided a conical bottom 15 which forms an air chest or plenum 16 into which fluidizing air at substantially ambient temperature conditions is admitted from the fan 19 via pipe 17, which is valved at 18. A suitably sized and valved branch pipe 20 from the outlet of the fan 19 is connected to supply air to the start-up burner 21 which extends through the port or connection 22 on the cylindrical portion 10A of the reactor 10 above the level 13A of the bed and is directed downwardly so that the flame impinges on and penetrates into the bed 13. A blanked clean out nozzle 23 is provided below the level of the bed 13. Airborne coffee grounds are supplied to the bed 13 through a conduit 25 which is connected to the frusto-conical portion 10B of the reactor 10 below the level of the bed 13. A blanked fill connection 24 is provided at the top of the reactor 10, through which refractory bed material may be charged into the reactor.

During operation the reactor bed 13 consists of a mixture of particle-form chemically neutral refractory bodies and the coffee grounds being consumed. The refractory bodies may be of any suitable type, such as alumina bubbles, calcined kaolin or coarse common sand. This refractory material does not enter into the combustion process, but merely serves to give "body" to the bed 13 and to provide a "fly wheel" or heat storage effect to stabilize the combustion process.

To start the combustion process within the reactor 10, gaseous or liquid fuel is first admitted through the burner 21. After the bed 13 has been heated to a sufficiently high temperature, ambient temperature, secondary air is introduced from the fan 19 into the air chest 16 and through the constriction plate 11, the moisture laden fuel is introduced via conduit 25 into the bed 13 in suspension in a stream of ambient temperature primary air, and burning is commenced. As the combustion process becomes stabilized, the flow of auxiliary fuel from the burner 21 may be terminated, and the burner 21 withdrawn. With all of the necessary combustion air required to consume the coffee grounds entering the bed 13 as primary air through the conduit 25 or as secondary air via the openings 12 in the constriction plate 11, the bed 13 is an intimately mixed mass of the neutral refractory bodies and burning coffee grounds having a substantially uniform temperature throughout. Because of the intimate mixing within the bed 13, the amount of air required to complete combustion of the coffee grounds is substantially the stoichiometric quantity, i.e., between 100 and 105% total air. It has been found that by limiting the total moisture content of the fuel to about 70% by weight, the combustion process will be self-sustaining. For practical considerations, the bed temperature must, of course, be limited to the temperature that the refractory lining of the reactor 10 is capable of withstanding during extended periods of operation.

The hot gases resulting from the combustion of the coffee grounds pass from the free-board space 14 via the refractory lined outlet duct 26 into the superjacent furnace chamber 31 of the boiler 30 through an opening formed in the floor of the furnace chamber 31. The boiler 30 is preferably located immediately above the reactor 10 so that the relatively expensive refractory lined outlet duct 26 may be as short as possible. The boiler 30 is rigidly bottom supported on structural steel columns 32, and a suitable expansion joint 27 is provided in the outlet duct 26 to accommodate vertical expansion of the reactor 10 relative to the bottom supported boiler 30. The boiler 30 is of a standard type (as shown for example in U.S. Patent 2,563,489, issued Aug. 7, 1951, to W. H. Rowand), except that the gas flow passages are over-sized to avoid excessive gas velocities and pressure drop due to the increased flow of ash containing gas from the reactor 10. Preferably, the boiler 30 is provided with a primary air fan 34 and a fuel burner 33 so that supplementary fuel can be fired in the furnace chamber 31. With this flexibility feature, the steam output of the entire unit can be increased and varied to meet load demands independently of the operation of the reactor 10 by burning supplementary fuel in the furnace chamber 31. It should also be noted that the boiler 30 can be operated while the reactor 10 is inoperative if a small amount of air is passed from the fan 19 through the reactor 10 to avoid the backflow of gases from the furnace chamber 31 into the reactor 10.

The products of combustion passing from the boiler 30 flow through the breeching 35 to the stack 40. If desired, the breeching 35 may be connected tangentially to the stack 40, and a restrictor plate 36 may be provided inside the stack 40, to that the lower portion of the stack serves as a cyclone-type dust collector. A dust collection outlet 37 is provided at the base of the stack 40. A damper 38 is also provided in the stack 40 for purposes of regulating the gas pressure within the furnace chamber 31.

A unit of the type shown in the drawings and discussed above has been erected by the assignee of the present invention and successfully operated. This unit is designed to burn 9000 pounds per hour of wet coffee grounds (heating value of 10,400 b.t.u. per pound dry) containing approximately 65% moisture. Using about 5% excess air (at ambient temperature and about 2½ pounds positive pressure) to the reactor 10, the temperature of the bed 13 is about 1900° F., and the gaseous products of combustion product about 16,000 pounds per hour of steam in the associated boiler 30. By firing supplementary fuel in the burner 33, the total steam output of the boiler 30 can be increased to 40,000 pounds per hour. Because of the low ash content (about 0.2% weight) of the wet coffee grounds, it has not been necessary to provide any ash collecting facilities other than the outlet 37 at the base of the stack 40.

The above mentioned commercial unit has been found to have all the desirable objects set forth hereinbefore, i.e., lower capital cost and building space, increased total steam production (not including steam produced by firing of supplementary fuel) and decreased operating manpower requirements and maintenance costs. In addition, this unit is suitable for automatic control and integration into the overall plant operation.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. Apparatus for recovering heat from a particulate waste solid fuel having a moisture content in the range of 50–70% under self-sustaining combustion conditions and recovering heat therefrom comprising a bottom supported upright refractory lined fluidized bed reactor of circular horizontal cross-section having a reaction chamber formed by a cylindrical portion and a subjacent frusto-conical portion having its smallest diameter at its lower end, a constriction plate formed with a plurality of openings throughout its area and disposed at the lower end of said reaction chamber, said constriction plate being adapted to maintain thereon a bed of fluidizable solid inert refractory particles, walls forming an air chest below said constriction plate, means for supplying combustion air under a positive pressure to said air chest and upwardly through said openings into said bed to maintain said bed between predetermined levels within said frusto-conical portion, means for supplying said fuel to said reaction chamber below the level of said bed so as to intimately mix with said bed to thereby create a turbulent substantially uniform temperature fluidized mass of intimately mixed inert refractory particles and burning fuel throughout the bed, means forming a gas outlet at the upper end of the reaction chamber, a rigidly bottom supported waste heat boiler disposed immediately above said reactor and including a chamber having a floor with an opening formed therein, a refractory lined duct interconnecting said gas outlet and said opening for the passage of high temperature combustion products from the reactor directly to the furnace chamber, and an expansion joint in said duct for accommodating vertical thermal expansion of said reactor and said duct.

2. Apparatus for recovering heat from a particulate waste solid fuel having a moisture content in the range of 50–70% under self-sustaining combustion conditions and recovering heat therefrom comprising a bottom supported upright refractory lined fluidized bed reactor of circular horizontal cross-section having a reaction chamber formed by a cylindrical portion and a subjacent frusto-conical portion having its smallest diameter at its lower end, a constriction plate formed with a plurality of closely and evenly spaced openings throughout its area and disposed at the lower end of said reaction chamber, said constriction plate being adapted to maintain thereon a bed of fluidizable solid inert refractory particles, walls forming an air chest below said constriction plate, means for supplying ambient temperature secondary combustion air under a positive pressure to said air chest and upwardly through said openings into said bed to maintain said bed between predetermined levels within said frusto-conical portion, means for supplying said fuel to said reaction chamber in suspension in a stream of ambient temperature primary air at a positive pressure below the level of said bed so as to intimately mix with said bed to thereby create a turbulent substantially uniform temperature fluidized mass of intimately mixed inert refractory particles and burning fuel throughout the bed, means forming a gas outlet at the upper end of the reaction chamber, a rigidly bottom supported waste heat boiler disposed immediately above said reactor and including a boiler section for producing steam and a furnace chamber having a floor with an opening formed therein, a refractory line duct interconnecting said gas outlet and said opening for the passage of high temperature combustion products from the reactor directly to the furnace chamber, an expansion joint in said duct for accommodating vertical thermal expansion of said reactor and said duct, and means for burning supplemental fuel in said furnace chamber to produce additional hot gaseous combustion products for flow through said boiler section with the high temperature combustion products from said reactor.

References Cited
UNITED STATES PATENTS

| | | | |
|---|---|---|---|
| 1,611,040 | 12/1926 | Jahn et al. | 122—7 X |
| 2,157,993 | 5/1939 | Woodman | 122—2 |
| 2,650,084 | 8/1953 | White | 263—21 X |
| 2,774,661 | 12/1956 | White | 263—21 X |
| 2,977,105 | 3/1961 | Pyzel | 263—21 X |
| 3,223,058 | 12/1965 | Tanner | 110—10 |

FOREIGN PATENTS

| | | |
|---|---|---|
| 626,336 | 5/1927 | France. |
| 584,711 | 1/1947 | Great Britain. |

OTHER REFERENCES

Publication: Chemical and Engineering News; May 7, 1962.

FREDERICK L. MATTESON, JR., *Primary Examiner.*

H. B. RAMEY, *Assistant Examiner.*